United States Patent Office 3,495,895
Patented Feb. 17, 1970

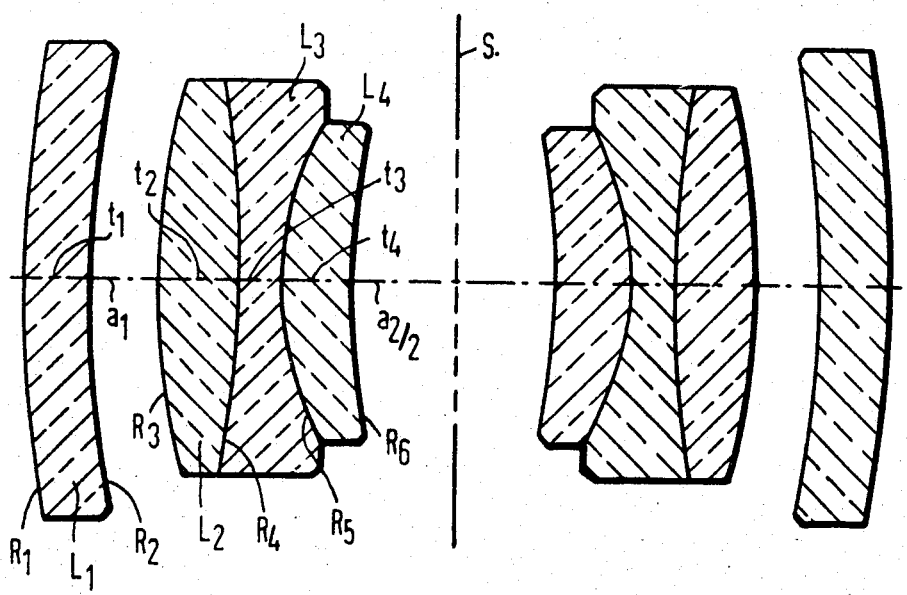

3,495,895
APOCHROMATIC, SYMMETRICAL, WIDE-ANGLE OBJECTIVE LENS SYSTEM
Franz Schlegel, Munich, Germany, assignor to Optische Werke G. Rodenstock, Munich, Germany
Filed July 5, 1967, Ser. No. 651,291
Claims priority, application Germany, Sept. 1, 1966,
O 11,923
Int. Cl. G02b 9/34
U.S. Cl. 350—220                        2 Claims

ABSTRACT OF THE DISCLOSURE

A symmetrical, apochromatic lens system having two outer members which are simple lenses of little refractive power and two inner members which are meniscus-shaped, cemented triplets. The index of refraction increases from glass to glass of the triplet outwardly of the system in approximately equal steps, the central glass of the triplet being asymmetrically biconcave. The surface of the central glass which has the smaller radius of curvature faces toward the other triplet.

BACKGROUND OF THE INVENTION

This invention relates to objective lens systems for use in photographic equipment, and particularly to objective lens systems suitable for the color reproduction of paintings and the like on substantially the full original scale.

More specifically, the invention is concerned with semi-wide angle lenses of the symmetrical type having low aperture and an angular field of 40° to 45°. The quality of the entire image produced in reproduction work must be extremely high. Even at focal lengths of the order of one meter and corresponding other dimensions of the lens system, the axial chromatic aberration must be reduced to practically zero. True apochromatic correction is necessary, and the intercept lengths for the three basic colors must be strictly the same.

The invention provides an improved objective lens system meeting these requirements.

SUMMARY OF THE INVENTION

The objective lens system of the invention consists of eight glasses symmetrically arranged relative to an air space which may hold the stop of the system. The system includes two inner members which are meniscus-shaped, cemented triplets, and two outer members which are simple lenses, airspaced from the inner members.

The indices of refraction of the three glasses which constitute each triplet increase from glass to glass in approximately equal steps not differing by more than ±0.02 in a direction outwardly of the lens system. The spherical aberration of the lens system reaches a minimum, when the magnitude of each step is approximately 0.1, and when the central glass of the triplet is unsymmetrically biconcave. The ratio of the radii of curvature of the two faces of the biconcave glass should be between 1:3 and 1:6 in absolute value. The dispersion of this glass in the blue part of the spectrum should be low. The face of the central glass having the smaller radius of curvature is directed toward the stop and the other triplet.

The outer members are meniscus-shaped and have only little refractive power which may be positive or negative. It should not exceed 30% of the refractive power of the entire lens system, in absolute values. The outer members have a beneficial effect on the residual astigmatism of oblique rays.

BRIEF DESCRIPTION OF THE DRAWING

The sole figure of the appended drawing shows an objective lens system of the invention in conventional axial section.

DESCRIPTION OF PREFERRED EMBODIMENTS

As seen in the drawing, the objective lens system of the invention consists of eight glasses symmetrically arranged relative to a stop S. In each of the symmetrical halves of the lens, an outer member $L_1$ is a simple meniscus-shaped lens, and the inner member is a cemented, meniscus-shaped triplet constituted by the glasses $L_2$–$L_4$.

The radii of curvature R, thickness $t$, air spaces $a$ are tabulated below for two lens systems of the invention having an apparent focal length of 100, and a relative aperture of $f/15$. The indices of refraction $n_e$ and Abbe number $V_e$ are also listed in the table for each element of the lens system together with the glass type designation from the Schott catalog. The lens system of Example 2 is shown in the drawing.

|       |           | Example 1 |           |        | Example 2 |        |
|-------|-----------|-----------|-----------|--------|-----------|--------|
| Glass |           |           | $n_e/V_e$ | Schott |           | $n_e/V_e$ | Schott |
| $L_1$ | $R_1$     | +18.81    |           |        | +24.01    |           |        |
|       | $t_1$     | 1.75      | 1.518/56.6 | K2    | 1.35      | 1.520/65.0 | PK2   |
|       | $R_2$     | +18.71    |           |        | +21.28    |           |        |
|       | $a_1$     | 1.22      |           |        | 1.22      |           |        |
| $L_2$ | $R_3$     | +18.13    |           |        | +14.51    |           |        |
|       | $t_2$     | 1.77      | 1.661/57.1 | LaK11 | 1.67      | 1.623/60.1 | SK16  |
|       | $R_4$     | −43.61    |           |        | −21.73    |           |        |
| $L_3$ | $t_3$     | 0.79      | 1.560/53.7 | KzFS2 | 0.79      | 1.560/53.7 | KzFS2 |
|       | $R_5$     | +8.93     |           |        | +5.96     |           |        |
| $L_4$ | $t_4$     | 1.43      | 1.466/65.7 | FK3   | 1.43      | 1.517/54.5 | FK3   |
|       | $R_6$     | +18.13    |           |        | +15.26    |           |        |
|       | $a_2/2$   | 1.95      |           |        | 1.95      |           |        |

Many beneficial results of this invention can be achieved with lens systems in which the refractive powers of glass surfaces, glass thicknesses and air spaces, indices of refraction and Abbe numbers differ slightly from the listed values. The Schott glasses are listed merely as examples of glasses having well defined optical properties.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed is:
1. An apochromatic objective lens system comprising:
    (a) two substantially identical outer glasses; and
    (b) two substantially identical inner glasses,
        (1) said glasses being arranged symmetrically relative to an air space separating said inner glasses,

(2) each inner glass being a meniscus-shaped cemented triplet,
(3) the outer glasses being simple lenses and air spaced from respective inner glasses,
(4) the apparent focal length of said system being 100, the radii of curvature R, glass thicknesses $t$, air spaces $a$, indices of refraction $n_e$, and Abbe numbers $V_e$ of said glasses not differing substantially from those tabulated:

| Glass | | $n_e/V_e$ |
|---|---|---|
| $L_1$ | $\begin{cases} R_1=+18.81 \\ t_1=1.75 \\ R_2=+18.71 \\ a_1=1.22 \end{cases}$ | 1.518/56.6 |
| $L_2$ | $\begin{cases} R_3=+18.13 \\ t_2=1.77 \\ R_4=-43.61 \end{cases}$ | 1.661/57.1 |
| $L_3$ | $\begin{cases} t_3=0.79 \\ R_5=+8.93 \end{cases}$ | 1.560/53.7 |
| $L_4$ | $\begin{cases} t_4=1.43 \\ R_6=+18.13 \\ a_2/2=1.95 \end{cases}$ | 1.466/65.7 |

2. An apochromatic objective lens system comprising:
(a) two substantially identical outer glasses; and
(b) two substantially identical inner glasses,
 (1) said glasses being arranged symmetrically relative to an air space separating said inner glasses,
 (2) each inner glass being a meniscus-shaped cemented triplet,
 (3) the outer glasses being simple lenses and air spaced from respective inner glasses,
 (4) the apparent focal length of said system being 100, the radii of curvature R, glass thicknesses $t$, air spaces $a$, indices of refraction $n_e$, and Abbe numbers $V_e$ of said glasses not differing substantially from those tabulated:

| Glass | | $n_e/V_e$ |
|---|---|---|
| $L_1$ | $\begin{cases} R_1=+24.01 \\ t_1=1.35 \\ R_2=+21.28 \\ a_1=1.22 \end{cases}$ | 1.520/65.0 |
| $L_2$ | $\begin{cases} R_3=+14.51 \\ t_2=1.67 \\ R_4=-21.73 \end{cases}$ | 1.623/60.1 |
| $L_3$ | $\begin{cases} t_3=0.79 \\ R_5=+5.96 \end{cases}$ | 1.560/53.7 |
| $L_4$ | $\begin{cases} t_4=1.43 \\ R_6=+15.26 \\ a_2/2=1.95 \end{cases}$ | 1.517/54.5 |

References Cited

UNITED STATES PATENTS 2,734,424   2/1956   Bertele   350—215
3,038,380   6/1962   Eismann et al.   350—220

FOREIGN PATENTS 183,426   8/1966   U.S.S.R.

DAVID SCHONBERG, Primary Examiner
P. A. SACHER, Assistant Examiner